UNITED STATES PATENT OFFICE.

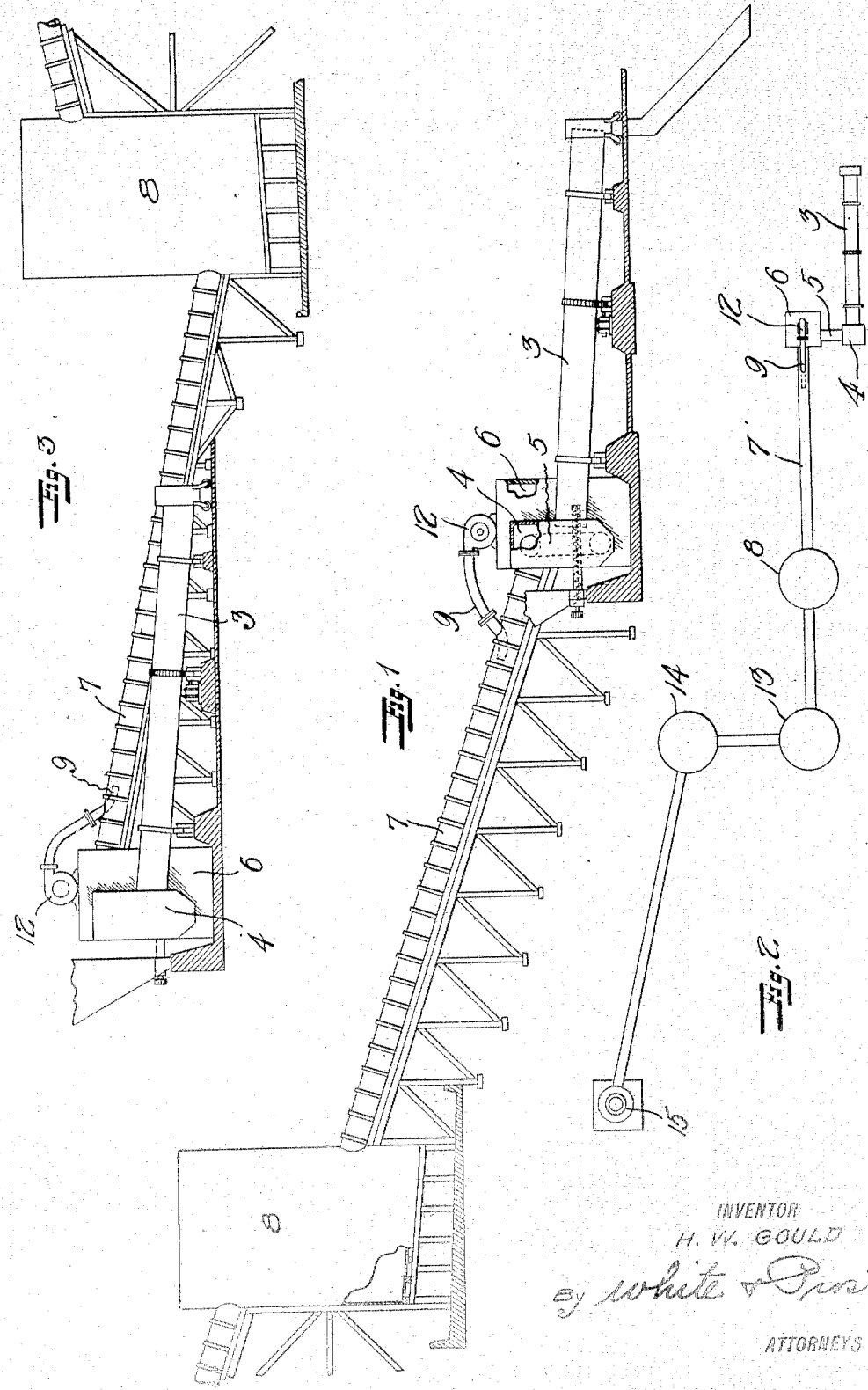

HENRY W. GOULD, OF SAN FRANCISCO, CALIFORNIA.

PROCESS OF RECOVERING QUICKSILVER FROM ITS ORES.

1,315,663.   Specification of Letters Patent.   Patented Sept. 9, 1919.

Application filed December 3, 1917. Serial No. 205,059.

*To all whom it may concern:*

Be it known that I, HENRY W. GOULD, a citizen of the United States, and a resident of the city and county of San Francisco and State of California, have invented a certain new and useful Process of Recovering Quicksilver from Its Ores, of which the following is a specification.

The invention relates to a process of condensing the quicksilver vapor liberated from the ore in a furnace and collecting the condensed metal.

An object of the invention is to provide a process for condensing the quicksilver vapor into a coalescent mass of quicksilver.

The invention possesses other advantageous features, some of which, with the foregoing, will be set forth at length in the following description, where I shall outline in full the process of my invention and that form of apparatus for carrying out the process which I have selected for illustration in the drawings accompanying and forming part of the present specification. In said drawings I have shown two specific forms of the apparatus of my invention, but it is to be understood that I do not limit myself to any specific apparatus.

Referring to said drawings:

Figure 1 is a side elevation of one form of the apparatus of my invention, part thereof being broken away to reduce the size of the figure.

Fig. 2 is a plan or top view of the apparatus shown in Fig. 1.

Fig. 3 is a side elevation of a portion of a modified form of apparatus.

Heretofore, as far as I am aware, the quicksilver vapor from the roasting furnace has been conducted to a series of large condensing chambers, usually made of brick, wherein the quicksilver condensed in relatively small particles which did not coalesce, so that further treatment of the condensed mass was necessary. Quicksilver ore usually contains sulfur, which is converted into sulfuric acid in the roasting process and this acid coats the small quicksilver particles when condensation occurs and deters the coalescence of the particles. The products of combustion from the furnace are commingled with the vapor and deposited in the condensing chambers with the quicksilver forming a sooty mass.

In accordance with the process of my invention the quicksilver vapor, or a large proportion of it, is condensed and precipitated in coalescent form before the condensing chamber is reached. This is accomplished by flowing the vapor, gases and other products discharged from the furnace, through a conduit and introducing a stream of air into the conduit in the direction of the stream therein. The introduction of the air causes a condensation and precipitation of the quicksilver vapor and by directing the air in the same direction as the gas stream, the furnace draft is increased and other materials, such as soot, in the gas stream, are prevented from precipitating and mixing with the condensed quicksilver. The condensed quicksilver coalesces and the conduit is preferably inclined so that the quicksilver runs from the conduit and is collected.

The quicksilver ore is roasted in any suitable furnace 3 and the products of roasting and combustion pass from the furnace into the chamber 4. From the upper part of the chamber 4 the gases and vapors pass through the downwardly-inclined conduit 5 into the bottom of the chamber 6. From the chamber 6, the gases and vapors pass into the inclined conduit 7, preferably formed of terra-cotta or tile pipe, which opens at its end into the closed tank 8. The conduit 7 is relatively long and may slope upward, as shown in Fig. 1 or downward, as shown in Fig. 3.

Extending into the conduit 7, preferably adjacent the chamber 6, is an air pipe 9, which directs a stream of air into the conduit in the same direction as the gases flowing therein. Air under pressure is supplied to the pipe 9 by a blower 12 or other device. The air causes a condensation of the quicksilver vapor in the conduit 7, which precipitates and flows from the conduit into the chamber 6 in the construction shown in Fig. 1 and into the tank 8, in the construction shown in Fig. 3. The lighter vapors and soot, passing through the conduit 7, are carried along and prevented from precipitating by the draft through the conduit, so that the precipitated quicksilver particles do not become coated or contaminated, but coalesce and the coalescent mass flows from the conduit.

The gases and vapors after passing through the conduit 7, pass in succession through a series of tanks 8, 13, 14 and thence to the stack 15, the successive tanks being preferably arranged at successively higher levels, to assist the stack in producing the required draft. Soot, sulfuric acid and quicksilver are deposited in the successive tanks, some of the quicksilver coalescing and settling to the bottom and some of it remaining in small particles in the mass of soot. The tanks are preferably provided with sloping bottoms so that the quicksilver which coalesces therein may be drawn off. The sooty mass is removed and treated to recover the quicksilver therein. The larger portion of the quicksilver, however, is precipitated in the conduit by the admission of the air stream and flows from the conduit in coalescent form.

I claim:

The process of recovering quicksilver from its ore, which consists in roasting the ore in a furnace to produce quicksilver vapor, passing the furnace products into the lower side of a chamber then from the upper side of the chamber into an inclined conduit and introducing a stream of air into the conduit in the direction of the products whereby quicksilver vapor is condensed and precipitated.

In testimony whereof, I have hereunto set my hand at San Francisco, California, this 20th day of November, 1917.

HENRY W. GOULD.

In presence of—
H. G. Prost.